US008406137B2

(12) United States Patent
Siddam et al.

(10) Patent No.: US 8,406,137 B2
(45) Date of Patent: Mar. 26, 2013

(54) METHOD AND SYSTEM FOR GENERATING PCC RULES BASED ON SERVICE REQUESTS

(75) Inventors: Kalyan Premchand Siddam, Nepean (CA); Haiqing Ma, Ottawa (CA); Sachin Lalseta, Ottawa (CA); Fernando Cuervo, Dunrobin (CA)

(73) Assignee: Alcatel Lucent, Paris (FR)

( * ) Notice: Subject to any disclaimer, the term of this patent is extended or adjusted under 35 U.S.C. 154(b) by 301 days.

(21) Appl. No.: 12/825,049

(22) Filed: Jun. 28, 2010

(65) Prior Publication Data

US 2011/0317558 A1 Dec. 29, 2011

(51) Int. Cl.
*H04L 12/26* (2006.01)
(52) U.S. Cl. ....................... 370/235; 370/241
(58) Field of Classification Search .......... 370/229–236, 370/241.1, 252, 253; 709/223–226
See application file for complete search history.

(56) References Cited

U.S. PATENT DOCUMENTS

| | | | |
|---|---|---|---|
| 2010/0039941 A1* | 2/2010 | Tan et al. | 370/241 |
| 2010/0043053 A1* | 2/2010 | Wei et al. | 726/1 |
| 2010/0180319 A1* | 7/2010 | Hu et al. | 726/1 |
| 2011/0208853 A1* | 8/2011 | Castro-Castro et al. | 709/223 |
| 2011/0317558 A1* | 12/2011 | Siddam et al. | 370/235 |
| 2011/0320580 A1* | 12/2011 | Zhou et al. | 709/223 |
| 2011/0320584 A1* | 12/2011 | Siddam et al. | 709/224 |
| 2012/0064878 A1* | 3/2012 | Castro Castro et al. | 455/418 |

OTHER PUBLICATIONS

ETSI TS 129 212, "Universal Mobile Telecommunications System (UMTS); LTE; Policy and Charging Control Over Gx Reference Point (3GPP TS 29.212 version 9.2.0 Release 9)", 2010.
ETSI TS 129 213, "Digital Cellular Telecommunications System (Phase 2+); Universal Mobile Telecommunications System (UMTS); LTE; Policy and Charging Control Signalling Flows and Quality of Service (QoS) Parameter Mapping (3GPP TS 29.213 version 9.2.0 Release 9)", 2010.
ETSI TS 129 214, "Universal Mobile Telecommunications System (UMTS); LTE; Policy and Charging Control Over Rx Reference Point (3GPP TS 29.214 version 9.3.0 Release 9)", 2010.
3rd Generation Partnership Project; Technical Specification Group Core Network and Terminals; Policy and Charging Control signalling flows and Quality of Service (QoS) parameter mapping (Release 9), 3GPP Stadard; 3Gpp TS 29.213 3rd Generation Partnership Project (3GPP) Mobile Competence Centre; 650, Route Des Lucioles; F-06921 Sophis-Antipolis Cedex; France No. V9.2.0, Apr. 2, 2010 (Jan. 2, 2010), pp. 1-129.

(Continued)

*Primary Examiner* — Gary Mui
(74) *Attorney, Agent, or Firm* — Kramer & Amado P.C.

(57) ABSTRACT

Various exemplary embodiments relate to a method of generating a Policy and Control Charging (PCC) rule for managing packet traffic across a network. The method may include: receiving a request message for PCC rules from a requesting network component; authorizing a set of QoS information based on the requested set of QoS information; generating a PCC rule; and transmitting the PCC rule to an enforcing network component. The request message may include a requested set of QoS information and multiple traffic mappings each describing a flow of packets transmitted across the network. The PCC rule may include the authorized set of QoS information and multiple flow descriptions corresponding to each traffic mapping. The PCRN may include: a first interface that receives a request message, a policy engine, a rule generator, and a second interface that transmits the PCC rule to an enforcing network component.

20 Claims, 6 Drawing Sheets

OTHER PUBLICATIONS

3rd Generation Partnership Project; Technical Specification Group Services and System Aspects; Policy and charging control architecture (Release 9) 3GPP Standard; 3GPP TS 23.203, 3RD Generation Partnership Project (3GPP) Mobile Competence Centre; 650, Route Des Lucioles; F-06921 Sophia-Antipolis Cedex France, No. V9.5.0. Jun. 10, 2010 pp. 1-123.

Nokia Siemens Networks et al; "QoS Authorization for incomplete service information", 3GPP Draft; S2-087805, 3Rd Generation Partnership Project (3GPP), Mobile Competence Centre; 650, Route Des Lucioles, F-06921 Sophis-Antipolis Cedex, France. No. Miami 20081112. Nov. 12, 2008, XP050332221.

3rd Generation Partnership Project; Technical Specification Group Core Network and Terminals; Policy and Charging Control over Gx reference point (Release 9), 3GPP Standard; 3GPP TS 29.212, 3rd Generation Partnership Project (3GPP) Mobile Competence Centre; 650, Route Des Lucioles; F-06921 Sophia-Antipolis Cedex; France. No. VP.0.0, Sep. 1, 2009, pp. 1-92, XP050372354.

International Search Report for PCT/IB2011/001781 dated Dec. 23, 2011.

* cited by examiner

| | Rule Name | Service Data Flow Filters | Flow Status | QoS Parameters | Charging Parameters | Bearer |
|---|---|---|---|---|---|---|
| 535 | 0xE426 | 1:0x90F2CE32 2:0x3920B92C | {Open;Open} | {8; 5mbps;20mbps} | {0.05/MB} | {0x684C} |
| 540 | 0x99B2 | 1:0xB2B56FE1 2:0x34B88A02 | {Open;Open} | {6; 16mbps;16mbps} | {0.10/min} | {0x28B2} |
| 545 | ... | ... | ... | ... | ... | ... |

FIG. 5

METHOD AND SYSTEM FOR GENERATING PCC RULES BASED ON SERVICE REQUESTS

TECHNICAL FIELD

Various exemplary embodiments disclosed herein relate generally to policy and charging in telecommunications networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications further provide some guidance as to how these elements interact in order to provide reliable data services and charge subscribers for use thereof.

For example, 3GPP TS 29.212, 29.213, and 29.214 specifications provide some guidance on generating policy and charging control (PCC) rules. 3GPP TS 29.212 describes the steps taken by a PCRF when it receives requests for PCC rules from the PCEF or requests for quality of service (QoS) rules from the BBERF. 3GPP TS 29.213 describes QoS authorization based on requested QoS for service data flows (SDF). 3GPP TS 29.214 describes the steps taken by a PCRF when it receives request for PCC rules from an application function (AF).

The specifications, however, do not describe how to generate PCC rules when the request message does not fully provide QoS information. For example, a request from an AF may not include QoS information for every media sub-component. The specifications provide little detail for generating PCC rules when information is missing. Requests from the PCEF face the same problem when including multiple packet filters.

In view of the foregoing, it would be desirable to provide a Policy and Charging Rules Node (PCRN) implementing a PCRF capable of generating PCC rules for traffic mappings with incomplete QoS information. In particular, it would be desirable to generate PCC rules that effectively satisfy service requests although the QoS information may be incomplete.

SUMMARY

In light of the present need for a PCRN capable of generating PCC rules for traffic mappings with incomplete QoS information, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method of generating a Policy and Control Charging (PCC) rule for managing packet traffic across a network, the method may include: receiving a request message for PCC rules from a requesting network component; authorizing a set of QoS information based on the requested set of QoS information; generating a PCC rule; and transmitting the PCC rule to an enforcing network component. The request message may include: a requested set of QoS information including a requested bandwidth, a first traffic mapping describing a flow of packets transmitted across the network, and a second traffic mapping describing a second flow of packets transmitted across the network. The PCC rule may include: the authorized set of QoS information, a first flow description corresponding to the first traffic mapping, and a second flow description corresponding to the second traffic mapping. Various exemplary embodiments relate to the above method encoded on a machine-readable storage medium as instructions for a PCRN to generate a PCC rule.

Various exemplary embodiments relate to a Policy and Charging Rules Node (PCRN) for generating Policy and Control Charging PCC rules. The PCRN may include: a first interface that receives a request message for PCC rules from a requesting network component; a policy engine that authorizes QoS information based on a requested set of QoS information; a rule generator that generates a PCC rule; and a second interface that transmits the PCC rule to an enforcing network component. The message may include: a requested set of QoS information including a requested bandwidth, a first traffic mapping describing a flow of packets transmitted across the network, and a second traffic mapping describing a second flow of packets transmitted across the network. The PCC rule may include the authorized set of QoS information, a first flow description corresponding to the first traffic mapping, and a second flow description corresponding to the second traffic mapping.

It should be apparent that, in this manner, various exemplary embodiments enable a PCRN capable of generating PCC rules for traffic mappings with incomplete QoS information. In particular, by creating PCC rules with multiple service data flows, the PCRN may allow the traffic mappings to share QoS information included at a higher level of the request message than the traffic mappings. Furthermore, PCC rules with multiple service data flows may satisfy service requests without allocating extra bandwidth.

BRIEF DESCRIPTION OF THE DRAWINGS

In order to better understand various exemplary embodiments, reference is made to the accompanying drawings, wherein:

FIG. 5 illustrates an exemplary data arrangement for storing PCC rules;

DETAILED DESCRIPTION

Figure 1:
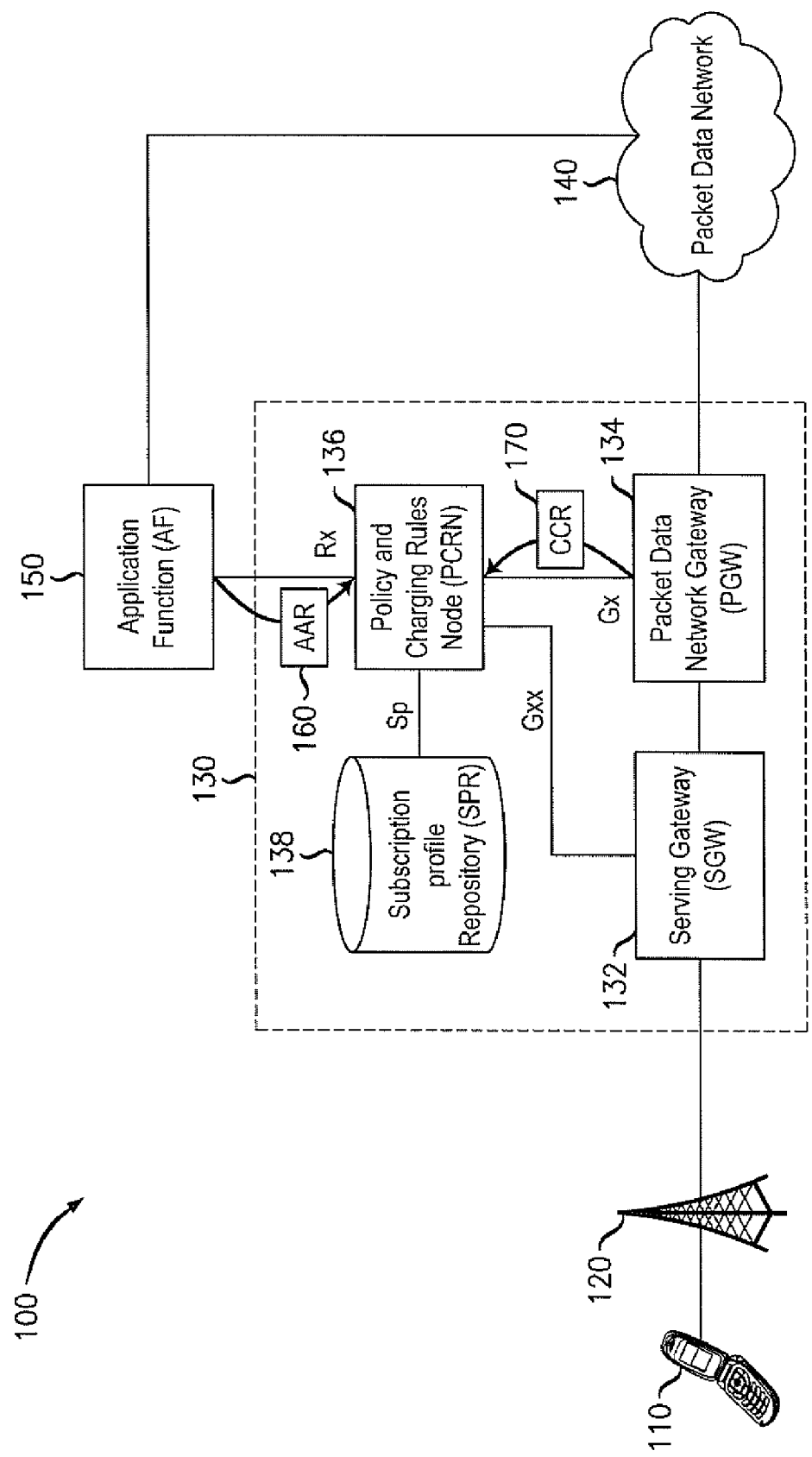
FIG. 1 illustrates an exemplary subscriber network for providing data services.

Referring now to the drawings, in which like numerals refer to like components or steps, there are disclosed broad aspects of various exemplary embodiments.

FIG. 1 illustrates an exemplary subscriber network 100 for providing various data services. Exemplary subscriber network 100 may be a telecommunications network or other network for providing access to various services. Exemplary subscriber network 100 may include user equipment 110, base station 120, evolved packet core (EPC) 130, packet data network 140, and application node (AN) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, smart phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with evolved packet core 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (PGW) 134, a policy and charging rules node (PCRN) 136 and a subscriber profile repository (SPR) 138.

Serving gateway (SGW) 132 may be a device that manages data paths between the base station 120 and PGW 134. The data paths may include virtual containers called bearers with unique Quality of Service (QoS) characteristics. The bearers may include virtual connections called service data flows (SDFs). In various embodiments where user equipment 110 is a mobile device and base station 120 is an eNodeB, SGW 132 may be responsible for establishing new bearers when the mobile device changes eNodeB. The SGW 132 may implement a bearer binding and event reporting function (BBERF) according to the 3GPP TS 29.212, 29.213, and 29.214 standards. In various embodiments, EPC 130 may include multiple serving gateways.

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Thus, PGW 134 may be a policy and charging enforcement node (PCEN). PGW 134 may request new PCC rules from PCRN 136 by sending a CCR message via the Gx interface. PGW 134 may also include a number of additional features such as, for example, packet filtering, deep packet inspection, and subscriber charging support.

Policy and charging rules node (PCRN) 136 may be a device that receives requests for application services, generates PCC rules, and provides PCC rules to the PGW 134 and/or other PCENs (not shown). PCRN 136 may be in communication with AN 150 via an Rx interface. As described in further detail below with respect to AN 150 and FIG. 3, PCRN 136 may receive a service request in the form of an AA-Request (AAR) 160 from AN 150. Upon receipt of AAR 160, PCRN 136 may generate at least one new PCC rule for fulfilling the service request 160.

PCRN 136 may also be in communication with SGW 132 and PGW 134 via a Gxx and a Gx interface, respectively. As described in further detail below with respect to FIG. 4, PCRN 136 may receive a service request in the form of a credit control request (CCR) 170 from SGW 132 or PGW 134. As with AAR 160, upon receipt of CCR 170, PCRN 136 may generate at least one new PCC rule for fulfilling the service request 170. In various embodiments, AAR 160 and CCR 170 may represent two independent service requests to be processed separately, while in other embodiments, AAR 160 and CCR 170 may carry information regarding a single service request and PCRN 136 may create at least one PCC rule based on the combination of AAR 160 and CCR 170. In various embodiments, PCRN 136 may be capable of handling both single-message and paired-message service requests.

Upon creating a new PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creating a new QoS rule or upon request by the SGW 132, PCRN 136 may provide a QoS rule to SGW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136 or may constitute an independent node within EPC 130. Data stored by SPR 138 may include an identifier of each subscriber and indications of subscription information for each subscriber such as bandwidth limits, charging parameters, subscriber priority, and subscriber service preferences.

Packet data network 140 may be any network for providing data communications between user equipment 110 and other devices connected to packet data network 140, such as AN 150. Further, packet data network 140 may provide, for example, phone and/or Internet service to various user devices in communication with packet data network 140.

Application Node (AN) 150 may be a device that provides an application service to user equipment 110. Thus, AN 150 may be a server or other device that provides, for example, streaming video service to user equipment 110. AN 150 may further be in communication with the PCRN 136 of the EPC 130 via an Rx interface. When AN 150 is to begin providing application service to user equipment 110, AN 150 may generate a service request message, such as an AA-Request (AAR) according to the Diameter protocol, to notify the PCRN 136 that resources should be allocated for the application service. Such an service request message may include information such as an identification of the subscriber using the application service and an identification of the particular SDFs that must be established within an IP-CAN session in order to provide the requested service. AN 150 may communicate such an service request to the PCRN via the Rx interface 215.

Figure 2:
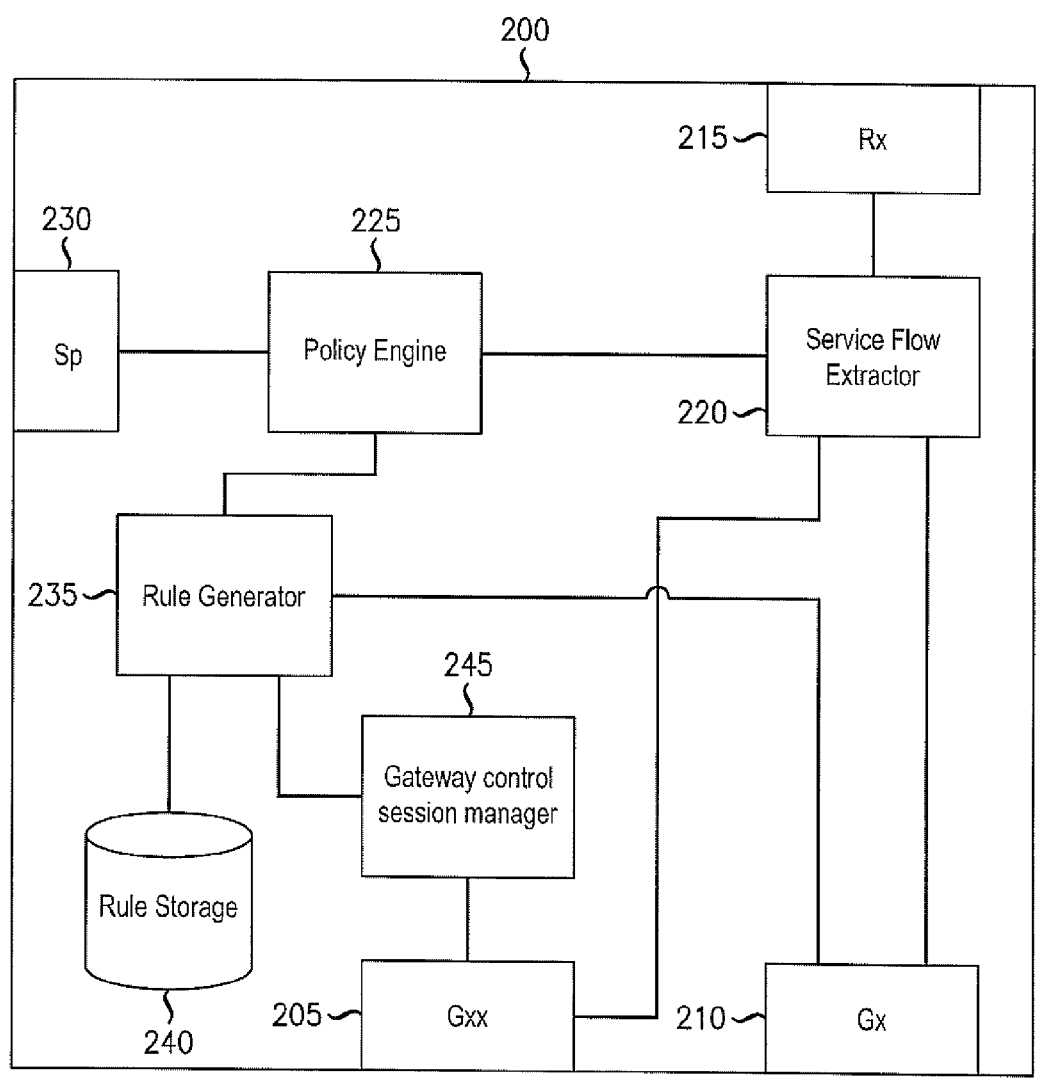
FIG. 2 illustrates an exemplary policy and control rules node (PCRN) for generating policy and charging control (PCC) rules.

FIG. 2 illustrates an exemplary policy and charging rules node (PCRN) 200 for creating new policy and charging control (PCC) rules in response to service requests. PCRN 200 may correspond to PCRN 136 of exemplary subscriber network 100. PCRN 200 may include Gxx interface 205, Gx interface 210, Rx interface 215, service flow extractor 220, policy engine 225, Sp interface 230, rule generator 235, rules storage 240, and gateway control session manager 245.

Gxx interface 205 may be an interface comprising hardware and/or executable instructions encoded on a machine-readable storage medium configured to communicate with a SGW such as SGW 132. Such communication may be implemented according to the 3GPP TS 29.212. Thus, Gxx interface 205 may receive requests for QoS rules and transmit QoS rules for installation. Gxx interface 205 may further receive UE-originated service requests in the form of a CCR.

Gx interface 210 may be an interface comprising hardware and/or executable instructions encoded on a machine-readable storage medium configured to communicate with a PGW such as PGW 134. Such communication may be implemented according to the 3GPP TS 29.212. Thus, Gx interface 210 may receive requests for PCC rules and transmit PCC rules for installation. Gx interface 210 may further receive UE-originated service requests in the form of a CCR, such as CCR 170.

Rx interface 215 may be an interface comprising hardware and/or executable instructions encoded on a machine-readable storage medium configured to communicate with an AN such as AN 150. Such communication may be implemented according to the 3GPP TS 29.214. For example, Rx interface 205 may receive a service request such as an AAR from AN 150.

Service flow extractor 220 may include hardware and/or executable instructions on a machine-readable storage medium configured to determine from a service request, at least one SDF for providing the requested service. As will be described in greater detail below with respect to FIGS. 3-4, a service request may identify a number of streams for providing the requested service. Each stream may include a traffic mapping such as a packet filter that describes packets associated with the stream. Service flow extractor 220 may then generate an SDF object to represent each requested data stream. Each SDF object may include information described by the service request such as, for example, requested bandwidth, traffic mapping, subscriber identifier, and/or data stream type. The service request may not indicate a specific bandwidth requested for each stream. Service flow extractor 220 may assign SDFs resulting from those streams a requested bandwidth based on other QoS information in the service request such as, for example, a bandwidth requested at a higher level. Service flow extractor 220 may also ignore a requested bandwidth included in a stream and assign a requested bandwidth based on other QoS information in the service request. Service flow extractor 220 may then group SDFs together based on the QoS information used in the SDF. For example, in the case of an AAR message, service flow extractor 220 may generate an SDF for each media sub-component and group the SDFs according to QoS information found in the media component description.

Policy engine 225 may include hardware and/or executable instructions on a machine-readable storage medium configured to authorize the QoS information of a received service request and/or an SDF object generated by the service flow extractor 220. For SDF objects grouped by QoS information, policy engine 225 may authorize one set of QoS information for multiple SDF objects. Policy engine 225 may authorize the QoS information based on subscriber data stored in SPR 138. Policy engine 225 may request subscriber data records from SPR 138 via Sp interface 230. If the requested QoS information exceeds the QoS allowed by the subscriber data record, policy engine 225 may reduce the requested QoS information to comply with the subscriber data record. Policy engine 225 may also deny the service request if the requested QoS information is not allowed by the subscriber data. Policy engine 225 may also limit the requested QoS information based on QoS limits of the requested bearer.

Sp interface 230 may be an interface comprising hardware and/or executable instructions encoded on a machine-readable storage medium configured to communicate with a SPR such as SPR 138. Thus, Sp interface 230 may transmit record requests and receive subscription profile records.

Rule generator 235 may include hardware and/or executable instructions on a machine-readable storage medium configured to generate a new PCC rule based on a received service request, an SDF object generated by the service flow extractor 220, and/or authorized QoS information. Rule generator may first generate a new PCC rule object. Next, rule generator 235 may generate a name for the new PCC rule and store it in the PCC rule object. The PCC rule name may be generated according to any method known to those of skill in the art such as, for example, incrementing a previously assigned rule name or generating a random name. Rule generator 235 may also insert other data into the PCC rule, including information ascertained from the AAR, CCR, and/or SDF such as, for example, bandwidth, flow status, and/or flow descriptions. Rule generator 235 may insert more than one flow description into a PCC rule. The flow descriptions may be the flow description of each SDF in a group of SDFs associated with a set of QoS information. The QoS information for the group may be inserted into the PCC rule. Thus, the PCC rule may have multiple flow descriptions sharing the same set of QoS information. At this point, the new PCC rule may be a valid rule ready for installation. Rule generator 230 may transmit the rule to PGW 134 via Gx interface 210 for installation. Rule generator 235 may also store the rule in rule storage 240.

Rule storage 240 may be any machine-readable medium capable of storing PCC rules generated by the PCRN 200. Accordingly, rule storage 240 may include a machine-readable storage medium such as read-only memory (ROM), random-access memory (RAM), magnetic disk storage media, optical storage media, flash-memory devices, and/or similar storage media. As will be described in further detail below with respect to FIG. 5, rule storage 240 may store definitions of numerous PCC rules created by PCRN 200. Such definitions may include, for example, rule names, service data flow filters, QoS parameters, and charging parameters.

Gateway control session manager 245 may include hardware and/or executable instructions on a machine-readable storage medium configured to generate and transmit QoS rules for installation at an SGW or other node implementing a gateway control session. In various embodiments utilizing gateway control sessions to provide QoS assurance, such as an embodiment utilizing PMIP, gateway control session manager 245 may extract information necessary to generate a QoS rule from a PCC rule. For example, gateway control session manager 245 may extract the rule name, service data flow filter, and QoS parameters from a PCC rule and generate a new QoS rule. Gateway control session manager 245 may then forward the new QoS rule to an SGW or other appropriate node via Gxx interface 205.

Figure 3:
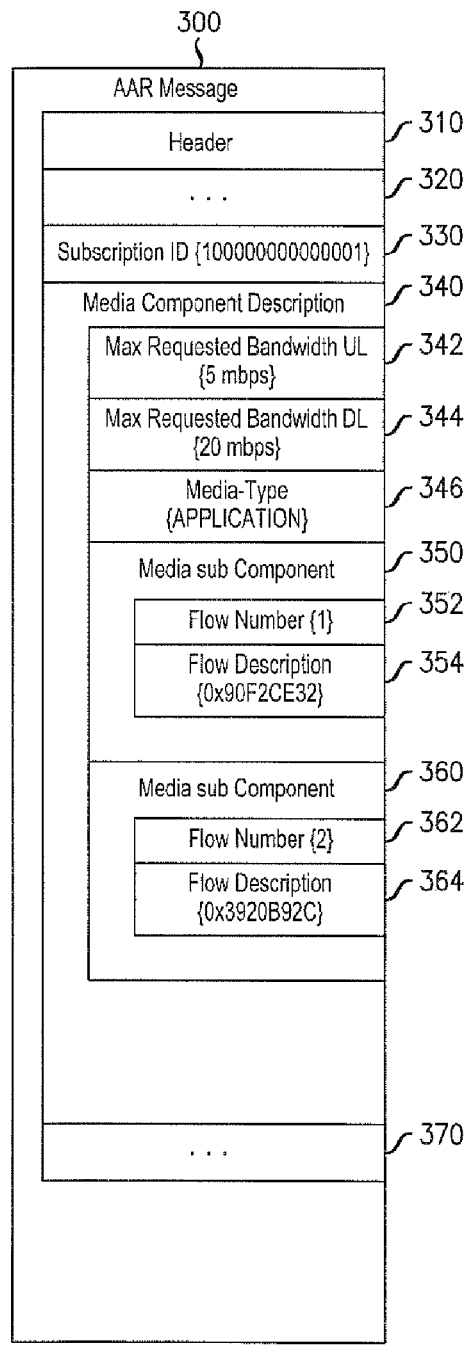
FIG. 3 illustrates an exemplary network-originated service request message in the form of an AA-Request (AAR) message.

FIG. 3 illustrates an exemplary network-originated service request message in the form of an AAR 300. AAR 300 may be constructed according to the Diameter message protocol and/or 3GPP TS 29.214. Accordingly, AAR 300 may include a header 310, subscription ID field 330, media component field 340, and a number of additional fields 320, 370. Note that the order of the fields of AAR 300 may vary. Thus, for example, subscription ID field 330 may be located after media component field 340.

Header 310 may be a standard Diameter header indicating that message 300 is an AAR. Thus, header 310 may include a command code field set to a value of 265 and the R-bit field of the command flags field set, as provided for by the Diameter protocol and 3GPP TS 29.214.

Subscription ID field 330 may be an attribute-value pair (AVP) for indicating a subscription that is associated with the particular request. For example, subscription ID field 330 indicates that the subscription identified by the value "100000000000001" is associated with AAR 300. This information may be used to access a subscription profile record and charge the appropriate subscriber in relation to the requested service.

Media component description field 330 may contain service information related to a media component of a requested service. In the example of AAR 300, the request may be for a streaming video. Media component 330 may, for example, correspond to the video portion of the stream. Media component field 340 may further include a maximum requested bandwidth (MRB) uplink (UL) field 342, a maximum requested bandwidth (MRB) downlink (DL) field 344, a media type field 346, and one or more media sub-components such as, for example, media sub-components 350 and 360.

MRB UL field 342 may indicate an amount of bandwidth requested for the media component for use in the uplink direction from UE 110 to AN 150. MRB UL field 342 may apply to any packet traffic for the media component 340. For example, MRB UL field 342 indicates that media component 340 requests 5 mbps for upload traffic. MRB DL field 344 may indicate an amount of bandwidth requested for the service for use in the downlink direction from AN 150 to UE 110. MRB DL field 344 may apply to any packet traffic for the media component 340. For example, MRB DL field 344 indicates that media component 340 requests 20 mbps for download traffic. Media type field 346 may indicate a type of service provided by the media component such as, for example, audio, video, data, application, control, text, message or other service. The contents of media type field 346 may be mapped to a QoS class identifier (QCI). MRB UL field 342, MRB DL field 344, and media type field 436 may be considered a set of QoS information for the media component level of the request.

Media sub-components 350, 360 may each indicate an independent data stream necessary for providing the requested service. Media sub-components 350, 360 may include fields for a flow number, flow description, maximum requested bandwidths, and any other field useful for defining a media sub-component. Media sub-components may include fewer fields than listed above.

For example, media sub-component 350 may include flow number field 352 and flow description field 354. Media sub-component 350 may be lacking any fields indicating a requested bandwidth. Flow number field 352 may include a number used to identify the flow associated with media sub-component 350. Flow description field 354 may include a filter used to identify packets associated with the flow of media sub-component 350. Flow description field 354 may be considered a traffic mapping.

As another example, media sub-component 360 may include flow number field 262 and flow description field 264. Media sub-component 360 may be lacking any fields indicating a requested bandwidth. Flow number field 362 may include a number used to identify the flow associated with media sub-component 360. Flow description field 364 may include a filter used to identify packets associated with the flow of media sub-component 360. Flow description field 354 may be considered a traffic mapping.

Additional fields 320, 370 may include additional information as specified by the Diameter protocol and/or 3GPP TS 29.214. Thus, additional fields 320, 360 may include additional attribute value pairs (AVPs) such as, for example, the Origin-Host AVP, Destination-Host AVP, Supported-Features AVP, Framed-IP-Address AVP, etc. Additional fields 320, 370 may be used in extracting other useful information such as, for example, flow identifying information.

Figure 4:
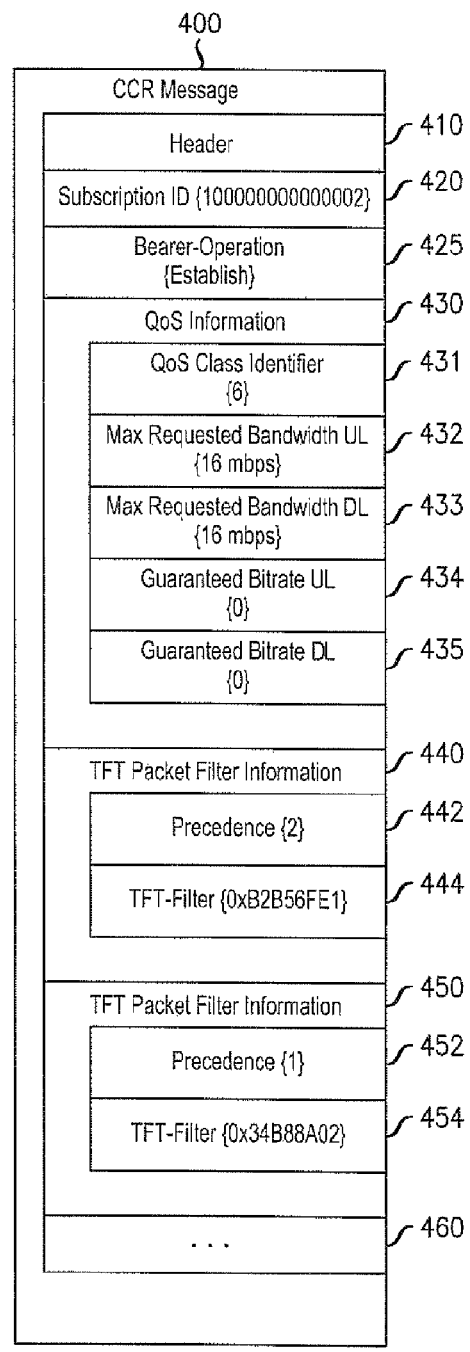
FIG. 4 illustrates an exemplary user equipment-originated service request message in the form of a credit control request (CCR) message.

FIG. 4 illustrates an exemplary user equipment-originated service request message in the form of a CCR 400. CCR 400 may be constructed according to the Diameter message protocol and/or 3GPP TS 29.212. Accordingly, CCR 400 may include a header 410, subscription ID field 420, bearer operation field 425, QoS information field 430, packet filter information fields 440, 450, and a number of additional fields 460. Note that the order of the fields of CCR 400 may vary. Thus, for example, subscription ID field 420 may be located after QoS information field 430, or packet filter information fields 440, 450. CCR messages may be used for different types of networks such as, for example, GPRS and EPS/LTE. Although FIG. 4 is shown as a request for a GPRS network, it should be appreciated that EPS/LTE or other networks may make requests using similar information.

Header 410 may be a standard Diameter header indicating that message 400 is a CCR. Thus, header 410 may include a command code field set to a value of 258 and the R-bit field of the command flags field set, as provided for by the Diameter protocol and 3GPP TS 29.212.

Subscription ID field 420 may be an attribute-value pair (AVP) for indicating a subscription that is associated with the particular request. For example, subscription ID field 430 indicates that the subscription identified by the value "100000000000002" is associated with CCR 400. This information may be used to access a subscription profile record and charge the appropriate subscriber in relation to the requested service.

Bearer operation field 425 may indicate whether the service request is requesting a new dedicated bearer. If bearer operation field 425 indicates that the bearer operation is establishment, PCRN 136 may create a dedicated bearer to satisfy the request. In various alternative embodiments such as, for example, a CCR from an LTE network, bearer operation field 425 may be a packet filter operation field, in which case an addition operation may indicate a request for a dedicated bearer.

QoS information field 430 may contain requested QoS settings for the requested service. QoS information field 430 may apply to every packet information field included in CCR 400, so QoS information field 430 may be considered a top level set of QoS information. QoS information field 430 may include QoS class identifier (QCI) field 431, MRB UL field 432, MRB DL field 433, guaranteed bitrate UL field 435, guaranteed bitrate DL field 435, bearer identifier 436 and ARP 437. QCI field 431 may include an identifier indicating the type of traffic requested. MRB UL 532 may indicate that the maximum bandwidth used by the service in the upload direction is 16 mbps. MRB DL field 433 may indicate that the maximum bandwidth used by the requested service in the download direction is 16 mbps. Guaranteed bitrate UL 434 may indicate that the minimum bandwidth required by the service in the upload direction is 0 mbps. Guaranteed bitrate DL 435 may indicate that the minimum bandwidth required by the service in the download direction is 0 mbps.

Packet filter information fields 440, 450 may contain service information related to each requested flow for the requested service. In various embodiments, such as those implementing LTE for example, packet filter information fields 440, 450 may be Packet-Filter-Information AVPs. In various alternative embodiments, such as those implementing GPRS for example, packet filter information fields 440, 450 may be TFT-Packet-Filter-Information AVPs. Packet filter information fields 440, 450 may include a precedence field, a filter content field and additional information such as, for example, a type of service, traffic class, and/or flow label. For example, packet filter information field 440 describes a TFT packet filter "0xB21358FE1" with a precedence of 2. As another example, packet filter information field 450 describes a TFT packet filter "0x34B99A02" with a precedence of 1. Packet filter information fields may be considered traffic mappings because the filter information can be used to identify a flow of packet traffic. Service flow extractor 220 may derive a flow description from the packet filter information by formatting the packet filter as a flow description according to 3GPP TS 29.214.

Additional fields 460 may include additional information as specified by the Diameter protocol and/or 3GPP TS 29.212. Thus, additional fields 460 may include additional attribute value pairs (AVPs) such as the CC-Request-Type AVP, Framed-IP-Address AVP, 3GPP-SGSN-Address AVP, etc. Additional fields 460 may be used in extracting other useful information such as, for example, flow identifying information.

FIG. 5 illustrates an exemplary data arrangement for storing PCC rules. Data arrangement 500 may be, for example, a table in a database stored in rules storage 240. Alternatively, data arrangement 500 could be a series of linked lists, an array, or a similar data structure. Thus, it should be apparent that data arrangement 500 is an abstraction of the underlying data; any data structure suitable for storage of this data may be used.

Data arrangement 500 may include data fields such as, for example, rule name field 505, service data flow filters field 510, flow status field 515, QoS parameters field 520, charging parameters field 525, and bearer field 530. Data arrangement 500 may include additional fields (not shown) required or useful in defining PCC rules. Data arrangement 500 may include multiple entries for rules such as, for example, rules 535, 540 and 545.

Rule name field 505 may indicate a rule name assigned to the PCC rule. The rule name may be assigned by rule generator 235 at the time the rule is generated. Service data flow filters field 510 may include one or more packet filters describing traffic packets associated with the data flow. The packet filters may be listed in order of their flow number. The presence of a packet filter within service data flow filters field 510 may indicate that the PCC rule should apply to any packet that matches the packet filter. Flow status field 515 may indicate whether traffic matching a packet filter is allowed to flow in either direction. QoS parameters field 520 may include QoS information for a PCC rule such as, for example, the QCI, MRB UL and MRB DL. QoS parameters field 520 may also include an Allocation Retention Priority (ARP) that may indicate the priority of the requested service in case the network must drop traffic or services. Charging parameters 525 may indicate a charging method to be applied to traffic associated with the PCC rule. Bearer field 530 may identify a bearer that may carry traffic associated with the PCC rule. If no bearer is identified, the default bearer may carry the traffic.

As an example of an entry in data arrangement 500, rule 535 indicates a rule with the rule name "0xE426." Rule 535 may be a PCC rule satisfying the service request of AAR 300, Rule 535 includes two service data flow filters, "0x90F2CE32" and "0x3920B92C." The flow status for both directions is open, indicating that traffic may be allowed to flow. The QCI of the traffic is 8. The MRB UL is 5 mbps and the MRB DL is 20 mbps. Because the PCC rule includes only one set of QoS information, the SDFs may share the requested bandwidth. This example PCC rule may be charged at a rate of 5 cents per megabyte of data transfer. The traffic associated with the PCC rule is assigned to bearer 0x684C.

As another example of an entry in data arrangement 500, rule 540 indicates a rule with the rule name "0x99B2." Rule 540 may be a PCC rule satisfying the service request of CCR 400. Rule 540 includes two service data flow filters, "0xB2B56FE1" and "0x34B88A02." The flow status for both directions is open, indicating that traffic may be allowed to flow. The QCI of the traffic is 6. The MRB UL is 16 mbps and the MRB DL is 16 mbps. Because the PCC rule includes only one set of QoS information, the SDFs may share the requested bandwidth. This example PCC rule may be charged at a rate of 10 cents per minute. The traffic associated with the PCC rule is assigned to bearer 0x28B2. Entry 545 may indicate that data arrangement 500 may include additional entries for additional rules.

Figure 6:
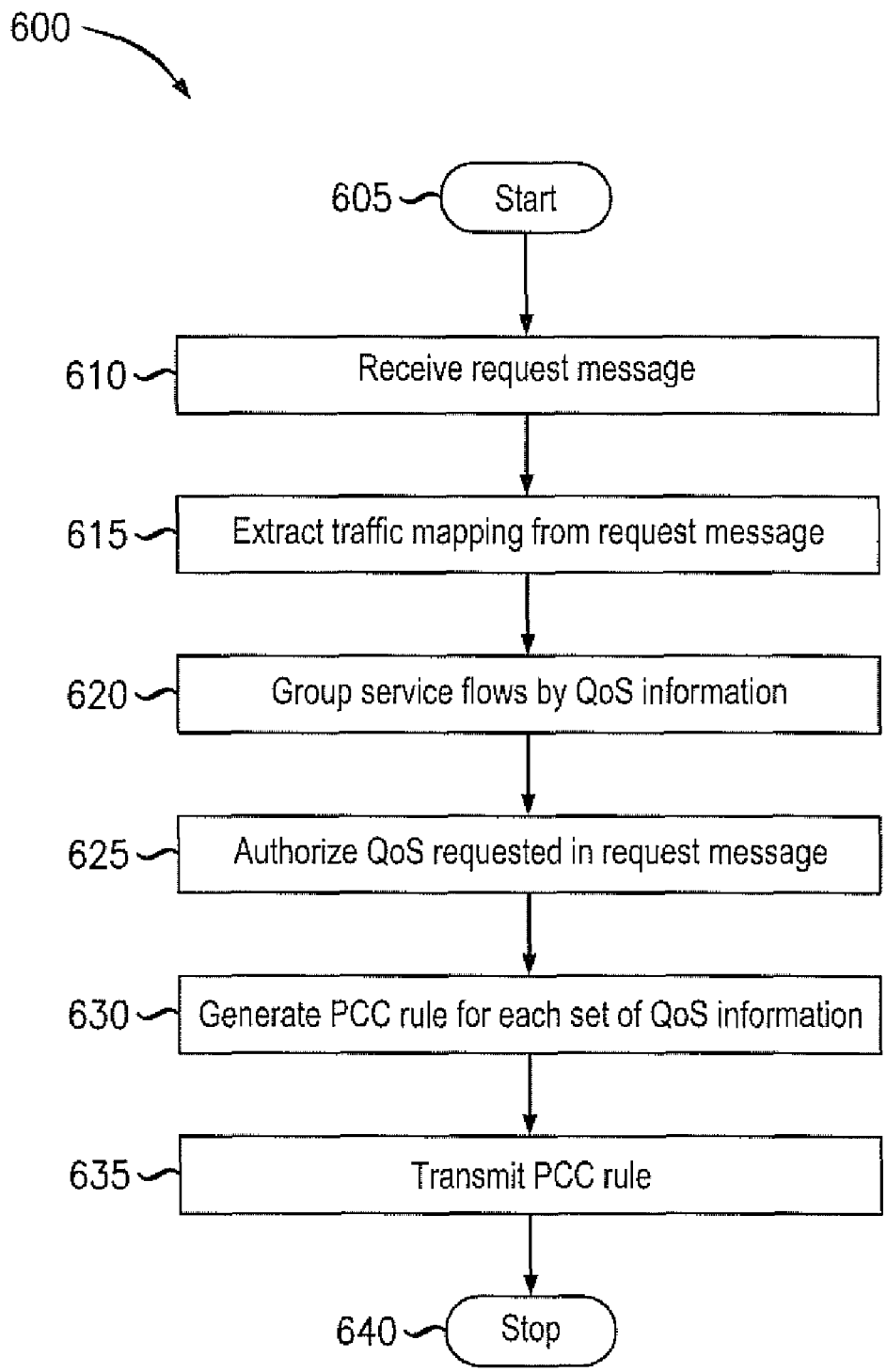
FIG. 6 illustrates an exemplary method for generating a PCC rule for more than one service data flow.

FIG. 6 illustrates an exemplary method 600 for generating a PCC rule for more than one SDF in response to a service request. Method 600 may be performed by the components of PCRN 136 and/or PCRN 200 to establish PCC rules for SDFs identified by a service request.

Method 600 may begin at step 605 and proceed to step 610 where PCRN 200 may receive a service request in the form of an AAR via the Rx interface 215 and/or a CCR via the Gxx interface 205 or Gx interface 210. At this point, service flow extractor 220 may determine whether the received message corresponds to another, complementary message, either previously received or expected to be received. If so, service flow extractor 220 may generate a full service request according to any manner known to those of skill in the art of processing complementary service requests.

Method 600 may then proceed to step 615 where service flow extractor 220 may extract a traffic mapping from the service request. In the case of an AAR, service flow extractor 210 may extract the media components and media sub-components from the AAR and establish an SDF object for each media subcomponent. The SDF object for a media subcomponent may include a traffic mapping from a flow description such as flow description AVPs 354 and 364. In the case of a CCR, service flow extractor 220 may establish an SDF object for each packet filter information field such as, for example, packet filter information 440 and 450. Service flow extractor 220 may extract a traffic mapping such as, for example, a TFT-Filter AVP or Filter-Content AVP from the packet filter information field. Service flow extractor 220 may then derive a flow description from the traffic mapping and store the flow description in the SDF object. The method 600 may then proceed to step 620.

In step 620, service flow extractor 220 may group SDFs by higher level QoS information. For the case of an AAR message, higher level QoS information may include a bandwidth requested for a media component. Each SDF corresponding to a media sub-component within the media component may be grouped together. In the case of a CCR message, higher level QoS information may include a QoS information field such as QoS information field 430 that applies to all packet filter information within the CCR message. Each SDF corresponding to a set of packet filter information within the CCR message may be grouped together. Service flow extractor 220 may then send the grouped SDFs to policy engine 225. The method 600 may then proceed to step 625.

In step 625, policy engine 225 may authorize the QoS assigned to each SDF or group of SDFs. Policy engine 225 may request a subscriber record from SPR 138 via Sp interface 230. Policy engine 225 may then compare the requested QoS information with allowed QoS information in the subscriber record. Policy engine 225 may also check rules storage 235 for other rules for the same subscriber to determine whether the subscriber's aggregate requested QoS is allowed by the subscriber record. The subscriber record may also contain charging parameters for various types of traffic for the subscriber. Policy engine 225 may select a charging parameter based on the requested QoS. Once policy engine 225 has authorized the QoS information, it may pass the SDF objects to rule generator 235, and the method may proceed to step 630.

In step 630, rule generator 235 may generate PCC rules based on the SDF objects. Rule generator 235 may generate one rule for a group of SDF objects sharing the same QoS information. The rule may include the authorized set of QoS information for the group and a set of service flow information for each SDF object. Each set of service flow information may include a flow number for determining the order of applying the flow descriptions. The flow number may be based on a flow number from an AAR message. Rule generator 235 may include the charging parameters determined by policy engine 225 in the PCC rule. If the service request included a bearer identifier, rule generator 235 may include the bearer identifier in the PCC rule. Rule generator 235 may also generate other information for the PCC rule such as, for example, the rule name and flow status. Rule generator 245 may store the PCC rule in rules storage 240. The method may then proceed to step 635, where Gx interface 210 may transmit the PCC rule to PGW 134. PGW 134 may then enforce the PCC rule so that the QoS information is applied to all of the flow descriptions within the PCC rule. In this manner, the PCC rule provides the requested service. The method may then proceed to step 640 where it ends.

Figure 7:
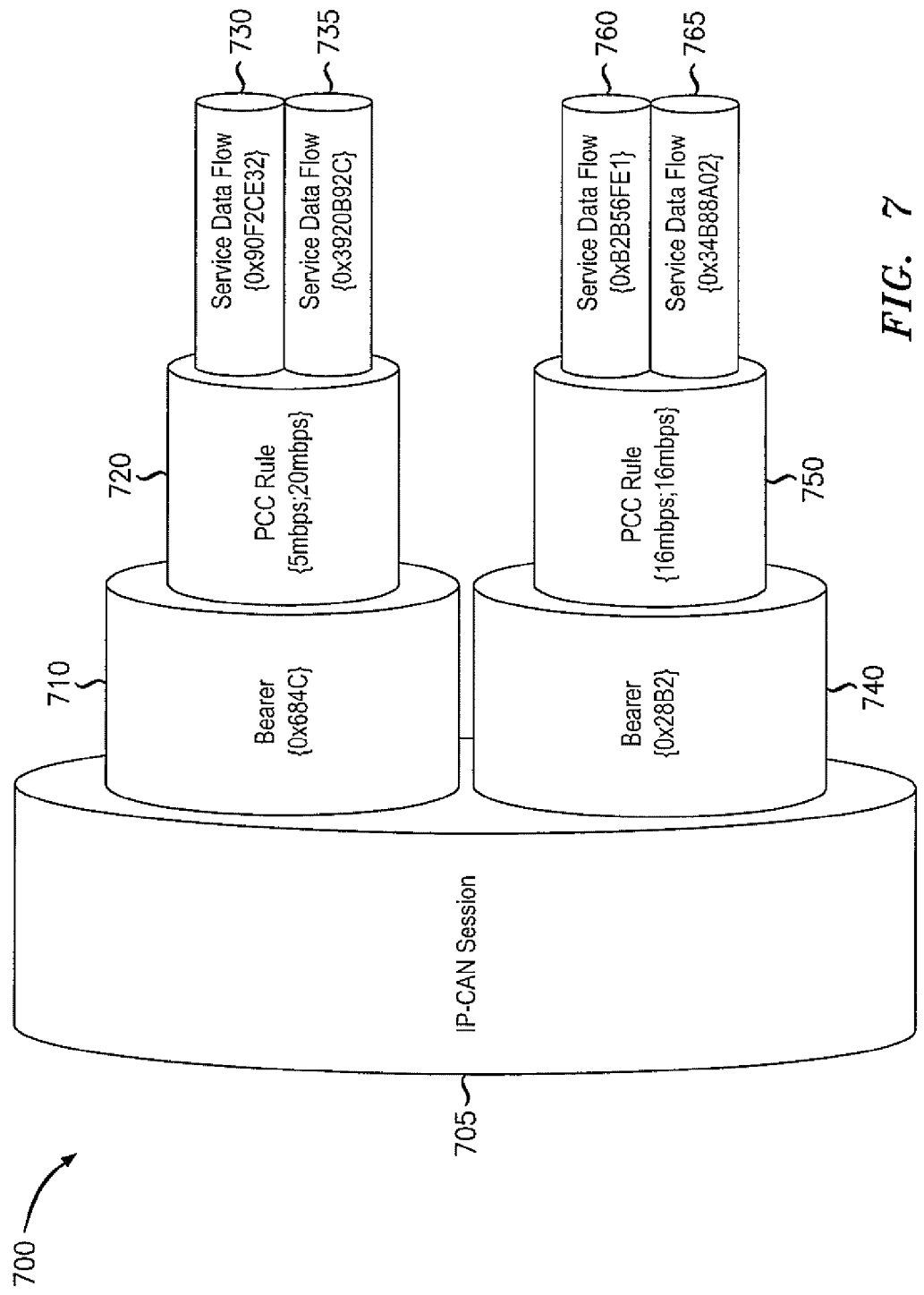
FIG. 7 illustrates an exemplary communication link implementing PCC rules with more than one service data flow.

FIG. 7 illustrates an exemplary communication link 700 implementing PCC rules with more than one SDF. Communication link 700 may include IP-CAN session 705, bearers 710 and 740, PCC rules 720 and 750 and service data flows 730, 735, 760 and 765.

IP-CAN session 705 may be a session establishing a communication link between UE 110 and PGW 134. IP-CAN session 705 may assign an IP address to UE 110 to enable communication with packet data network 140. IP-CAN session 705 may include multiple bearers such as bearers 710 and 740.

Bearer 710 may be a bearer created in response to AAR 300 to carry the traffic indicated in the request message. Bearer 710 may include the identifier "0x684C" to uniquely identify the bearer within IP-CAN session 705. Bearer 710 may include PCC rule 720 to manage QoS. PCC rule 720 may establish maximum bandwidths of 5 mbps upload and 20 mbps download. PCC rule 720 may also include other QoS information for managing QoS and charging for service. PCC rule 720 may include multiple service data flows such as, for example, service data flows 730 and 735. Service data flows 730 and 735 may each include a flow description for determining whether a packet belongs to the service data flow. Service data flows 730 and 735 may share the QoS information of PCC rule 720. Therefore, traffic identified by either service data flow 730 or 735 may be treated in the same manner for delivering QoS and for charging.

Bearer 740 may be a bearer created in response to CCR 400 to carry the traffic indicated in the request message. Bearer 740 may include the identifier "0x28B2" to uniquely identify the bearer within IP-CAN session 705. Bearer 740 may include PCC rule 750 to manage QoS. PCC rule 750 may establish maximum bandwidths of 16 mbps upload and 16 mbps download. PCC rule 750 may also include other QoS information for managing QoS and charging for service. PCC rule 750 may include multiple service data flows such as, for example, service data flows 760 and 765. Service data flows 760 and 765 may each include a flow description for determining whether a packet belongs to the service data flow. Service data flows 760 and 765 may share the QoS information of PCC rule 750. Therefore, traffic identified by either service data flow 760 or 765 may be treated in the same manner for delivering QoS and for charging.

Having described exemplary components and methods for the operation of exemplary subscriber network 100 and PCRN 200, an example of the operation of exemplary network 100 and PCRN 200 will now be provided with reference to FIGS. 1-7. PCRN 136 may correspond to PCRN 200. AAR 300 may correspond to AAR 160. CCR 400 may correspond to CCR 170. Data arrangement 500 may correspond to the contents of rules storage 240.

The process may begin when PCRN 200 receives AAR 300 from AN 150. Service flow extractor 220 may extract two traffic mappings from AAR 300, one for media sub-component 350 and one for media sub-component 360. Next, service flow extractor 220 may create an SDF object for each traffic mapping. Media sub-components 350 and 360 do not include any QoS information, so service flow extractor 220 may assign the SDFs to a group based on QoS information for media component 340. Media component 340 includes MRB UL 342 indicating 5 mbps and MRB DL 344 indicating 20 mbps. Service flow extractor 220 may assign this QoS information to the group of SDF objects. Service flow extractor 220 may then pass the group of SDF objects to policy engine 225.

Policy engine 225 may then authorize the requested QoS information. Policy engine 225 may request a subscriber profile from SPR 138 via Sp interface 230. If the requested QoS information is not allowed by the subscriber profile and/or internal policy rules, policy engine 225 may reduce the requested QoS information or deny the request. If the requested QoS information is allowed, policy engine 225 may authorize the requested QoS information and pass the SDF objects to rule generator 235. Policy engine 225 may include charging parameters determined based on the subscriber profile along with the authorized QoS information.

Rule generator 235 may then generate PCC rule 530 for the grouped SDF objects. Rule generator 235 may include both flow descriptions 354 and 364 as the service data flow filters 510 of the PCC rule. The authorized QoS information may be inserted into QoS parameters 520. Likewise, the charging parameters determined by policy engine 225 may be inserted into charging parameters 525. Rule generator 235 may generate data for other rule fields such as, for example, rule name 505 and flow status 515. Rule generator 235 may also generate a CCA message to install the new rule in PGW 134. Gateway control session manager 245 may extract QoS information and service data flow filters from the PCC rule to generate a QoS rule to install at SGW 132 if required.

According to the foregoing, various exemplary embodiments provide for a PCRN capable of generating PCC rules for traffic mappings with no QoS information. In particular, by creating PCC rules with multiple service data flows, the PCRN may allow the traffic mappings to share QoS information included at a higher level of the request message than the traffic mappings. Furthermore, PCC rules with multiple service data flows may satisfy service requests without allocating extra bandwidth.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of generating a Policy and Control Charging (PCC) rule for managing packet traffic across a network, the method comprising:
   receiving a request message for PCC rules from a requesting network component, the message comprising:
      a first traffic mapping describing a flow of packets transmitted across the network,
      a second traffic mapping describing a second flow of packets transmitted across the network, and
      a requested set of QoS information including a requested bandwidth applicable to both the first traffic mapping and the second traffic mapping;
   authorizing a set of QoS information based on the requested set of QoS information;
   generating a PCC rule, the PCC rule comprising:
      a first flow description corresponding to the first traffic mapping,
      a second flow description corresponding to the second traffic mapping, and
      the authorized set of QoS information applicable to both the first flow description and the second flow description; and
   transmitting the PCC rule to an enforcing network component.

2. The method of claim 1, wherein the request message is a credit control request (CCR) message from a gateway and the first and second traffic mappings are packet filter information, the method further comprising:
   deriving the first flow description from the first traffic mapping; and
   deriving the second flow description from the second traffic mapping.

3. The method of claim 2, wherein the CCR message requests a dedicated bearer and the PCC rule is associated with the dedicated bearer.

4. The method of claim 1, wherein the request message is an application authorization request (AAR) message from an application node and the first and second traffic mappings are flow descriptions of media subcomponents.

5. The method of claim 4, wherein the requested set of QoS information comprises:
   a media component maximum requested upload bandwidth; and
   a media component maximum requested download bandwidth.

6. The method of claim 1, wherein the first and second traffic mappings comprise at least one of:
   a TFT-Packet-Filter-Information AVP;
   a Packet-Filter-Information AVP; and
   a Flow-Description AVP.

7. The method of claim 1 wherein the method is performed by a policy and charging rules node (PCRN) and the step of authorizing comprises:
   determining whether the PCRN should satisfy the requested QoS information; and
   if the PCRN should not satisfy the requested QoS information, authorizing QoS information including a bandwidth less than the requested bandwidth.

8. The method of claim 1 wherein the first traffic mapping does not include a requested bandwidth and the second traffic mapping does not include a requested bandwidth.

9. A Policy and Charging Rules Node (PCRN) for generating Policy and Control Charging PCC rules, the PCRN comprising:
- a first interface that receives a request message for PCC rules from a requesting network component, the message comprising:
  - a first traffic mapping describing a flow of packets transmitted across the network, and
  - a second traffic mapping describing a second flow of packets transmitted across the network, and
  - a requested set of QoS information including a requested bandwidth applicable to both the first traffic mapping and the second traffic mapping;
- a policy engine that authorizes QoS information based on the requested set of QoS information;
- a rule generator that generates a PCC rule, the PCC rule comprising:
  - a first flow description corresponding to the first traffic mapping,
  - a second flow description corresponding to the second traffic mapping, and
  - the authorized set of QoS information applicable to both the first flow description and the second flow description; and
- a second interface that transmits the PCC rule to an enforcing network component.

10. The PCRN of claim 9, further comprising a rules storage that stores PCC rules generated by the rule generator.

11. The PCRN of claim 10, further comprising an Sp interface that communicates with a subscriber profile repository and provides subscriber information to the policy engine, wherein the policy engine authorizes QoS information based on the requested set of QoS information and the subscriber information.

12. The PCRN of claim 9 wherein the first interface receives a credit control request message wherein the first and second traffic mappings are packet filter information, wherein the service flow extractor derives the first flow description from the first traffic mapping and derives the second flow description from the second traffic mapping.

13. The PCRN of claim 9 further comprising a gateway control session manager that generates a QoS rule based on a PCC rule, the QoS rule comprising:
- the authorized set of QoS information;
- a first flow description corresponding to the first traffic mapping; and
- a second flow description corresponding to the second traffic mapping.

14. A non-transitory machine-readable storage medium encoded with instructions for a policy and rules charging node (PCRN) to generate Policy and Control Charging (PCC) rules, the non-transitory machine-readable storage medium comprising:
- instructions for receiving a request message for PCC rules from a requesting network component, the message comprising:
  - a first traffic mapping describing a flow of packets transmitted across the network, and
  - a second traffic mapping describing a second flow of packets transmitted across the network, and
  - a requested set of QoS information including a requested bandwidth applicable to both the first traffic mapping and the second traffic mapping;
- instructions for authorizing a set of QoS information based on the requested set of QoS information;
- instructions for generating a PCC rule, the PCC rule comprising:
  - a first flow description corresponding to the first traffic mapping,
  - a second flow description corresponding to the second traffic mapping, and
  - the authorized set of QoS information applicable to the first flow description and the second flow description; and
- instructions for transmitting the PCC rule to an enforcing network component.

15. The non-transitory machine-readable storage medium of claim 14, wherein the request message is a credit control request (CCR) message from a gateway and the first and second traffic mappings are packet filter information, the method further comprising:
- instructions for deriving the first flow description from the first traffic mapping; and
- instructions for deriving the second flow description from the second traffic mapping.

16. The non-transitory machine-readable storage medium of claim 15, wherein the CCR message requests a dedicated bearer and the PCC rule is associated with the dedicated bearer.

17. The non-transitory machine-readable storage medium of claim 14, wherein the request message is an application authorization request (AAR) message from an application node and the first and second traffic mappings are flow descriptions of media sub-components.

18. The non-transitory machine-readable storage medium of claim 17, wherein the requested set of QoS information comprises:
- a media component maximum requested upload bandwidth; and
- a media component maximum requested download bandwidth.

19. The non-transitory machine-readable storage medium of claim 14 wherein the instructions for authorizing comprise:
- instructions for determining whether the PCRN should satisfy the requested QoS information; and
- instructions for authorizing QoS information including a bandwidth less than the requested bandwidth if the PCRN should not satisfy the requested QoS information.

20. The non-transitory machine-readable storage medium of claim 14 wherein the first traffic mapping does not include a requested bandwidth and the second traffic mapping does not include a requested bandwidth.

* * * * *